(12) United States Patent
Kurosaka et al.

(10) Patent No.: US 10,167,610 B2
(45) Date of Patent: Jan. 1, 2019

(54) CONSTRUCTION MACHINE

(71) Applicant: Hitachi Construction Machinery Co., Ltd., Taito-ku, Tokyo (JP)

(72) Inventors: Shosei Kurosaka, Tsuchiura (JP); Hiroki Sugawara, Kasumigaura (JP); Kazuhiko Mizoguchi, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/753,029

(22) PCT Filed: Sep. 2, 2016

(86) PCT No.: PCT/JP2016/075838
§ 371 (c)(1),
(2) Date: Feb. 15, 2018

(87) PCT Pub. No.: WO2017/158874
PCT Pub. Date: Sep. 21, 2017

(65) Prior Publication Data
US 2018/0238022 A1 Aug. 23, 2018

(30) Foreign Application Priority Data
Mar. 18, 2016 (JP) ................... 2016-055380

(51) Int. Cl.
*E02F 9/00* (2006.01)
*F01N 3/08* (2006.01)
(Continued)

(52) U.S. Cl.
CPC ............ *E02F 9/0883* (2013.01); *B60K 11/04* (2013.01); *B60K 13/04* (2013.01); *E02F 9/00* (2013.01);
(Continued)

(58) Field of Classification Search
CPC ......... E02F 9/0883; E02F 9/00; E02F 9/0866; B60K 11/04; B60K 13/04; F01N 3/08;
(Continued)

(56) References Cited

U.S. PATENT DOCUMENTS 8,794,673 B2 * 8/2014 Kimura ................... E02F 9/00
180/326
8,997,468 B2 * 4/2015 Kondo ................. F01N 13/002
60/295
(Continued)

FOREIGN PATENT DOCUMENTS

JP 6-18466 A 3/1994
JP 2008-240678 A 10/2008
(Continued)

OTHER PUBLICATIONS

International Search Report (PCT/ISA/210) issued in PCT Application No. PCT/JP2016/075838 dated Nov. 8, 2016 with English-language translation (five (5) pages).
(Continued)

*Primary Examiner* — John D Walters
(74) *Attorney, Agent, or Firm* — Crowell & Moring LLP

(57) ABSTRACT

A reducing agent tank (11) is disposed in a first space (SP1) on an upstream side of cooling air with respect to a heat exchanger (21), and an engine (13) and an injector (14) are disposed in a second space (SP2) on a downstream side of the cooling air with respect to the heat exchanger (21). The heat exchanger is placed on a bracket (30) having a first side plate section (32), a second side plate section (33), and a top plate section (31), and a first cutout section (34) for allowing a reducing agent hose (25) to be inserted, a second cutout section (35) for allowing the reducing agent hose to be inserted are provided in the first side plate section and the second side plate section, respectively, and a portion of the reducing agent hose passes through the first cutout section
(Continued)

and the second cutout section to be wired in an internal space (SP3) of the bracket.

2 Claims, 4 Drawing Sheets

(51) Int. Cl.
  *B60K 11/04* (2006.01)
  *B60K 13/04* (2006.01)
  *E02F 9/08* (2006.01)
  *F01N 3/20* (2006.01)
(52) U.S. Cl.
  CPC .............. *E02F 9/0866* (2013.01); *F01N 3/08* (2013.01); *F01N 3/2066* (2013.01); *F01N 2610/02* (2013.01); *F01N 2610/1406* (2013.01); *F01N 2610/1433* (2013.01); *F01N 2610/1453* (2013.01)
(58) Field of Classification Search
  CPC .............. F01N 3/2066; F01N 2610/02; F01N 2610/1406; F01N 2610/1433; F01N 2610/1453
  USPC .................................................. 180/309, 68.4
  See application file for complete search history.

(56) References Cited

U.S. PATENT DOCUMENTS

| | | | |
|---|---|---|---|
| 9,290,906 B2 * | 3/2016 | Kobayashi | E02F 9/0866 |
| 9,945,099 B2 * | 4/2018 | Ishida | B60K 13/04 |
| 2010/0266458 A1 * | 10/2010 | Takeshita | E02F 9/0866 |
| | | | 422/109 |
| 2013/0294876 A1 | 11/2013 | Kobayashi et al. | |
| 2014/0083781 A1 | 3/2014 | Kimura et al. | |
| 2014/0246262 A1 * | 9/2014 | Mori | E02F 9/0808 |
| | | | 180/309 |
| 2015/0000258 A1 | 1/2015 | Kondo et al. | |

FOREIGN PATENT DOCUMENTS

| | | |
|---|---|---|
| JP | 2012-144955 A | 8/2012 |
| JP | 2014-31643 A | 2/2014 |
| JP | 2015-227555 A | 12/2015 |
| WO | WO 2014/097492 A1 | 6/2014 |

OTHER PUBLICATIONS

Japanese-language Written Opinion (PCT/ISA/237) issued in PCT/JP2016/075838 dated Nov. 8, 2016 (three (3) pages).

* cited by examiner

CONSTRUCTION MACHINE

TECHNICAL FIELD

The present invention relates to a construction machine, and particularly to wiring of a reducing agent hose in an engine room in a hydraulic excavator.

BACKGROUND ART

In construction machines such as a hydraulic excavator, various devices of a driving system, such as an engine and a heat exchanger, are installed in an engine room. Recently, an exhaust gas post-treatment device for purifying exhaust gas of an engine is generally installed in an engine room from the consideration of an environment.

As an arrangement configuration of various devices in an engine room of a hydraulic excavator, for example, Patent Literature 1 is known. This Patent Literature 1 describes "a construction vehicle includes an engine, a cooling device that cools the engine by performing heat exchange with passing air, an exhaust gas purification section that reduces and purifies a nitrogen oxide in the exhaust gas of the engine by using a liquid reducing agent, a liquid reducing agent tank that stores a liquid reducing agent, and a vehicle body that has therein a ventilation space S2 through which air taken from the outside to be sent to the cooling device passes, and has a first side frame section disposed so as to face the ventilation space below the ventilation space, and a center frame disposed with a distance in the direction of the flow of air passing through the ventilation space with respect to the first side frame section. The liquid reducing agent tank is disposed in a space between the first side frame section and the center frame." (refer to summary).

CITATION LIST

Patent Literature

Patent Literature 1: Japanese Patent Laid-Open No. 2008-240678

SUMMARY OF INVENTION

Technical Problem

As the reducing agent for purifying exhaust gas, urea water is generally used. This urea water is deteriorated when the temperature of the urea water becomes high, and the urea water is frozen when the temperature of the urea water becomes low, and therefore it is necessary to consider influence by heat in order to perform wiring of a reducing agent hose for supplying urea water. On the other hand, for example, in a minimal swing radius type hydraulic excavator, the size in the front-rear direction of an upperstructure is restricted, and in a case where devices are installed on the upperstructure with a restricted space, there is an actual situation where it is difficult to ensure a sufficient space for wiring of the reducing agent hose.

Particularly, like Patent Literature 1, in a case where the liquid reducing agent tank (reducing agent tank) and the exhaust gas purification section (exhaust gas post-treatment device) including an injector are provided with the cooling device (heat exchange unit) therebetween at separate positions on the right and the left, it is not easy to suitably perform wiring of the reducing agent hose within a limited space on the upperstructure including the engine room while considering influence by heat. In Patent Literature 1, the wiring of the reducing agent hose is not specifically mentioned, cope with the influence by the heat to the reducing agent hose, and a problem for wiring the reducing agent hose by effectively utilizing the limited space on the upperstructure including the engine room are not considered.

The present invention has been made in view of the above actual situation, and an object of the invention is to provide a construction machine in which a reducing agent hose is less likely to be influenced by heat, and wiring of the reducing agent hose can be performed by effectively utilizing a limited space on an upperstructure including an engine room.

Solution to Problem

In order to attain the above object, the present invention is a construction machine having: an undercarriage; an upperstructure that is turnably provided on the undercarriage; an engine room that is provided on the upperstructure; a reducing agent tank that is disposed in a radiator space adjacent to the engine room, and stores a reducing agent; an engine, a cooling fan that rotates by driving of the engine, an injector that injects the reducing agent to exhaust gas exhausted from the engine, and a reducing agent hose that connects the injector and the reducing agent tank, which are provided in the engine room; and a heat exchanger that is disposed between the reducing agent tank and the cooling fan, performs heat exchange by cooling air generated by rotation of the cooling fan to cool the engine, the construction machine comprising a bracket for placing the heat exchanger, the bracket being composed of a strength member having a substantially U-shaped cross-section opened downward, having a first side plate section facing a side of the radiator space on which the reducing agent tank is disposed, a second side plate section facing inside of the engine room, and a top plate section connecting the first side plate section and the second side plate section, wherein a first cutout section for allowing the reducing agent hose to be inserted, and a second cutout section for allowing the reducing agent hose to be inserted are provided in the first side plate section and the second side plate section, respectively, and a portion of the reducing agent hose passes through the first cutout section and the second cutout section to be wired in an internal space of the bracket.

Advantageous Effects of Invention

According to the present invention, it is possible to provide a construction machine in which a reducing agent hose is less likely to be influenced by heat, and wiring of the reducing agent hose can be performed by effectively utilizing a limited space on an upperstructure including an engine room. A problem, a configuration, and an effect other than the above will be apparent from the description of the following embodiment.

DESCRIPTION OF EMBODIMENTS

Figure 1:
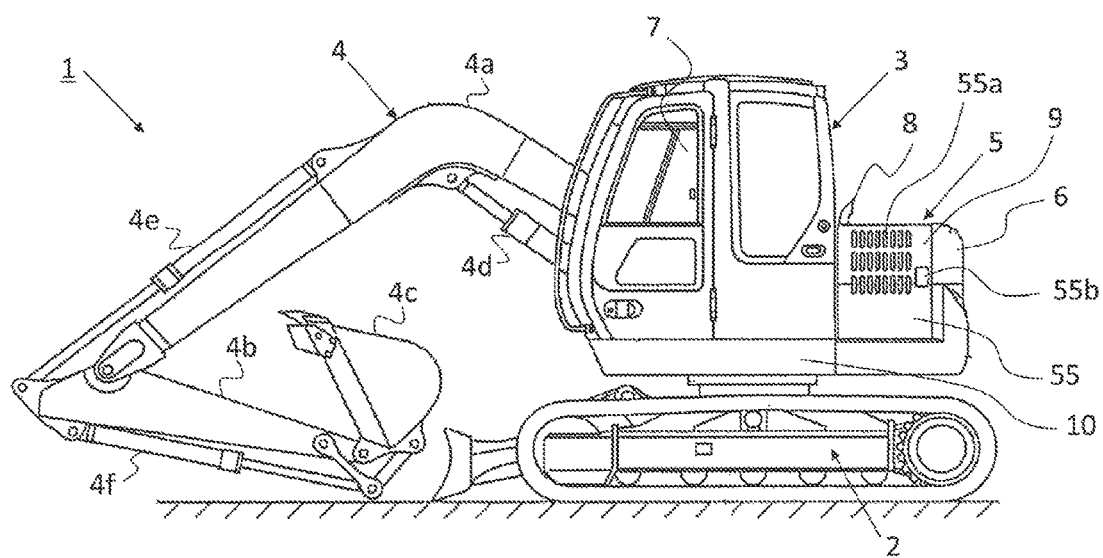
FIG. 1 is a side view of a minimal swing radius type hydraulic excavator according to an embodiment of the present invention.
Figure 2:
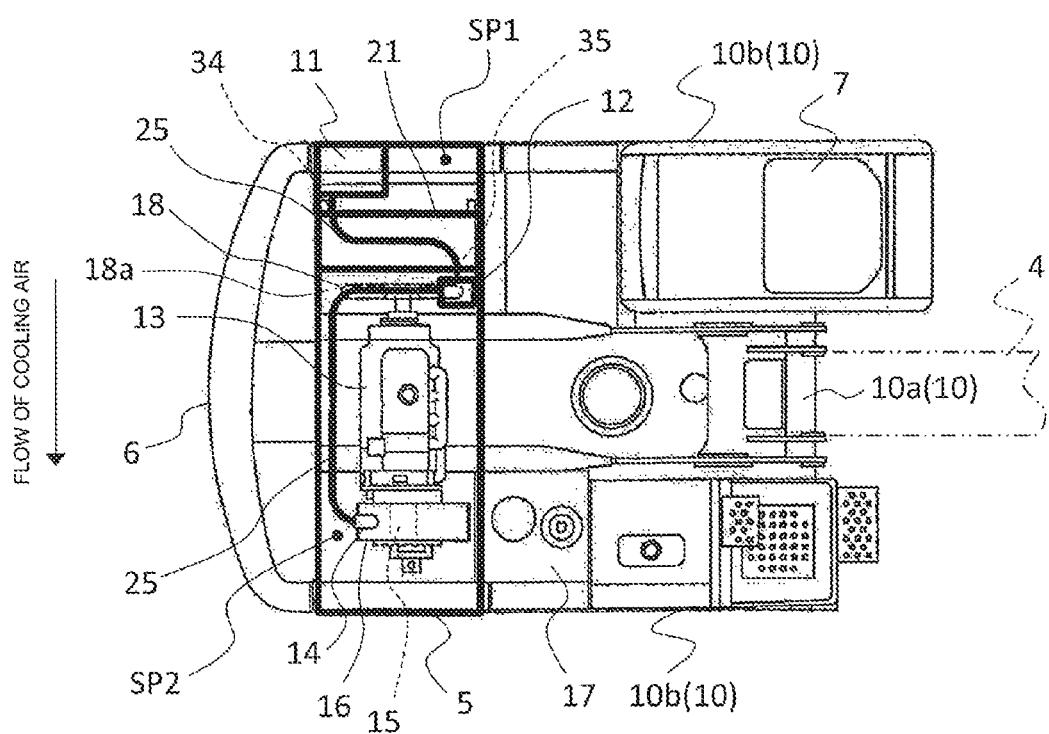
FIG. 2 is a plan view illustrating an outline of an internal configuration of an engine room of the minimal swing radius type hydraulic excavator illustrated in FIG. 1.

An embodiment of a construction machine according to the present invention will be described with reference to the drawings. FIG. 1 is a side view of a minimal swing radius type hydraulic excavator which is a representative example of the construction machine according to the present invention, and FIG. 2 is a plan view illustrating an outline of an internal configuration on an upperstructure including an engine room of the minimal swing radius type hydraulic excavator illustrated in FIG. 1. In the following description, front, rear, right, and left are used based on a viewpoint of a worker who is on board and operates the minimal swing radius type hydraulic excavator unless otherwise stated.

As illustrated in FIG. 1, a minimal swing radius type hydraulic excavator (hereinafter, referred to as a hydraulic excavator) 1 includes an undercarriage 2, and an upperstructure 3 turnably mounted on an upper side of this undercarriage 2. Herein, the small turning type means a type in which the turning diameter of the upperstructure is almost within the vehicle width of the undercarriage, and for example, when the turning diameter of the upperstructure of the hydraulic excavator is within about 120% of the vehicle width, the hydraulic excavator is classified in a small turning type. Of course, the technical scope of the present invention is not limited to the minimal swing radius type hydraulic excavator.

The upperstructure 3 includes a turning frame 10 that becomes a base, a cab 7 that is disposed on the front left side of this turning frame 10, a front working machine 4 that is mounted on a front center of the turning frame 10 so as to be rotatable in the vertical direction, a counterweight 6 that is disposed behind the turning frame 10, and an engine room 5 that is disposed between the front working machine 4 and the counterweight 6.

As illustrated in FIG. 2, the turning frame 10 is composed of a rigid body including a center frame 10a located at the center of the upperstructure 3, and side frames 10b provided on the right and the left of this center frame 10a, and the front working machine 4 is mounted at a leading end of the center frame 10a.

As illustrated in FIG. 1, the front working machine 4 includes a boom 4a, an arm 4b, a bucket 4c, and hydraulic cylinders (actuators) 4d to 4f. The counterweight 6 takes weight balance with the front working machine 4, and is formed as a circular arc heavy object. The counterweight 6 according to this embodiment is disposed at a position close to the turning center such that the rear side of the upperstructure 3 is almost within the vehicle width of the undercarriage 2 even during turning operation. Therefore, a space on the upperstructure is narrower than a space on a upperstructure of a general hydraulic excavator.

The engine room 5 is wholly covered with an exterior cover 9. On the left side of the exterior cover 9, an opening/closing door 55 that opens and closes in the left and right directions through a hinge (not illustrated) is provided. This opening/closing door 55 is provided with suction ports 55a that suck outside air (cooling air) into the engine room 5, and a grip 55b.

The suction ports 55a are provided on an upper part of the opening/closing door 55, and are formed in a plurality of slit shapes set to be oblong such that large rubbish does not enter the engine room 5 along with the outside air. The grip 55b is pulled, so that the opening/closing door 55 is opened, and maintenance work or the like in the engine room 5 is performed. Additionally, although not illustrated, on the right side of the exterior cover 9 of the engine room 5, a delivery port for delivering, to the outside, the outside air sucked from the suction ports 55a into the engine room 5 is formed. Reference numeral 8 denotes a tail pipe that discharges, to the outside, exhaust gas exhausted from an engine 13 (refer to FIG. 2).

Next, an internal configuration of the engine room 5 will be described. As illustrated in FIG. 2, the engine room 5 includes the engine 13, the heat exchange unit (heat exchanger) 21 that performs heat exchange with this engine 13, a urea water tank (reducing agent tank) 11 that stores urea water as a reducing agent, an exhaust gas post-treatment device 16 that is a device for purifying exhaust gas, and includes an injector 14 for injecting urea water to exhaust gas, a pump 12 for supplying urea water to the injector 14, and an operating oil tank 17 that stores operating oil. Reference numeral 15 denotes a reducing agent catalyst.

In the engine room 5, although not illustrated, a hydraulic pump that is driven by the engine 13, and supplies pressure oil to the hydraulic cylinders 4d to 4f and the like of the front working machine 4, a compressor for performing air conditioning inside the cab 7, an alternator, a level gauge, a reserve tank, and the like are provided.

The engine 13 is installed in a horizontal state extending in the right and left directions. Additionally, on a left end of the engine 13, a cooling fan 18 is mounted. The engine 13 is rotationally driven as a power source, so that the cooling fan 18 sucks outside air into the exterior cover 9 through the suction ports 55a (refer to FIG. 1). The cooling air sucked in the exterior cover 9 cools various devices installed in the engine room 5, and thereafter is exhausted from the delivery port (not illustrated) to the atmosphere. That is, in this embodiment, the cooling air flows from the left of the upperstructure 3 toward the right (from the top to the bottom in FIG. 2). Additionally, the heat exchange unit 21 is disposed so as to be opposed to the flow of the cooling air.

The heat exchange unit 21 has a radiator that cools cooling water for the engine 13, an oil cooler that cools operating oil for operating the front working machine 4, and an intercooler that cools intake air of the engine 13, and is disposed on the upstream side of the flow of the cooling air with respect to the cooling fan 18, that is, on the left side of the cooling fan 18. The heat exchange unit 21 is mounted on the turning frame 10 in a state where the radiator, the oil cooler, and the intercooler are integrated, and a core of each heat exchanger is detachable, in consideration of maintenance.

In a space that is on a vehicle body left side with respect to the engine room 5, and is adjacent to the engine room 5, the heat exchange unit 21 is provided. The heat exchange unit 21, the cooling fan 18 (including fan shroud 18a surrounding the cooling fan 18), and the engine 13 are disposed in order from the upstream side toward the downstream side of the flow of the cooling air. Additionally, a first space SP1 and a second space SP2 are formed with the heat exchange unit 21 (strictly, the fan shroud 18a) therebetween on the upstream side and the downstream side of the cooling air. That is, the engine room 5 is formed as the second space SP2 sectioned by the fan shroud 18a in the heat exchange unit 21, a rear partition plate provided on a vehicle body front side with respect to the counterweight 6 and on a vehicle body rear side with respect to the engine 13, and a front partition plate provided on the vehicle body front side with respect to the engine 13, and a partition plate on a vehicle body right side separated from the hydraulic pump located on the vehicle body right side with respect to the engine 13.

The first space SP1 is a space formed as a radiator space, and is on the upstream side of the cooling air, and therefore the temperature inside the first space SP1 is lower than the temperature inside the engine room 5 (second space SP2). The urea water tank 11 in which temperature management is important is installed in the first space SP1. Consequently, the urea water stored in the urea water tank 11 is kept at a suitable temperature. On the other hand, the exhaust gas post-treatment device 16 including the pump 12, the engine 13, and the injector 14, and the like are installed in the second space SP2. Therefore, the temperature inside the second space SP2 becomes high by exhaust heat of the engine 13 and the like.

The urea water tank 11 and the pump 12, and the pump 12 and the injector 14 are connected by a urea water hose (reducing agent hose) 25, and the urea water stored in the urea water tank 11 is sucked by the pump 12 through the urea water hose 25, and is sent to the injector 14 through the urea water hose 25 by the pump 12. Then, the urea water is injected from the injector 14 to exhaust gas exhausted from the engine 13. Ammonia generated from the urea water reduces a harmful nitrogen oxide contained in the exhaust gas in the reducing agent catalyst 15 to be decomposed into harmless water and nitrogen. The exhaust gas after purification treatment is exhausted from the tail pipe 8 (refer to FIG. 1).

In this embodiment, the urea water hose 25 configures a single complex obtained by being bundled with a cooling water hose for allowing cooling water (hot water) of the engine 13 to flow, for example. With such a configuration, the urea water inside the urea water hose 25 can absorb heat of the hot water inside the cooling water hose to prevent freezing of itself. Of course, the single urea water hose 25 may be wired.

Although not illustrated, the whole of the urea water hose 25 is covered by a heat insulator for the purpose of preventing freezing and preventing damage. Furthermore, the urea water hose 25 wired in the second space SP2 is particularly thermally influenced, and therefore is covered by a partially thick heat insulator 28 (refer to FIGS. 3 and 4). That is, the thickness of the heat insulator of the urea water hose 25 wired in the second space SP2 is made to be thicker than the thickness of the heat insulator of the urea water hose 25 wired in the first space SP1. The heat insulator for covering the urea water hose 25 wired in the first space SP1 is suitably determined in accordance with the use environment of the hydraulic excavator 1.

Figure 3:
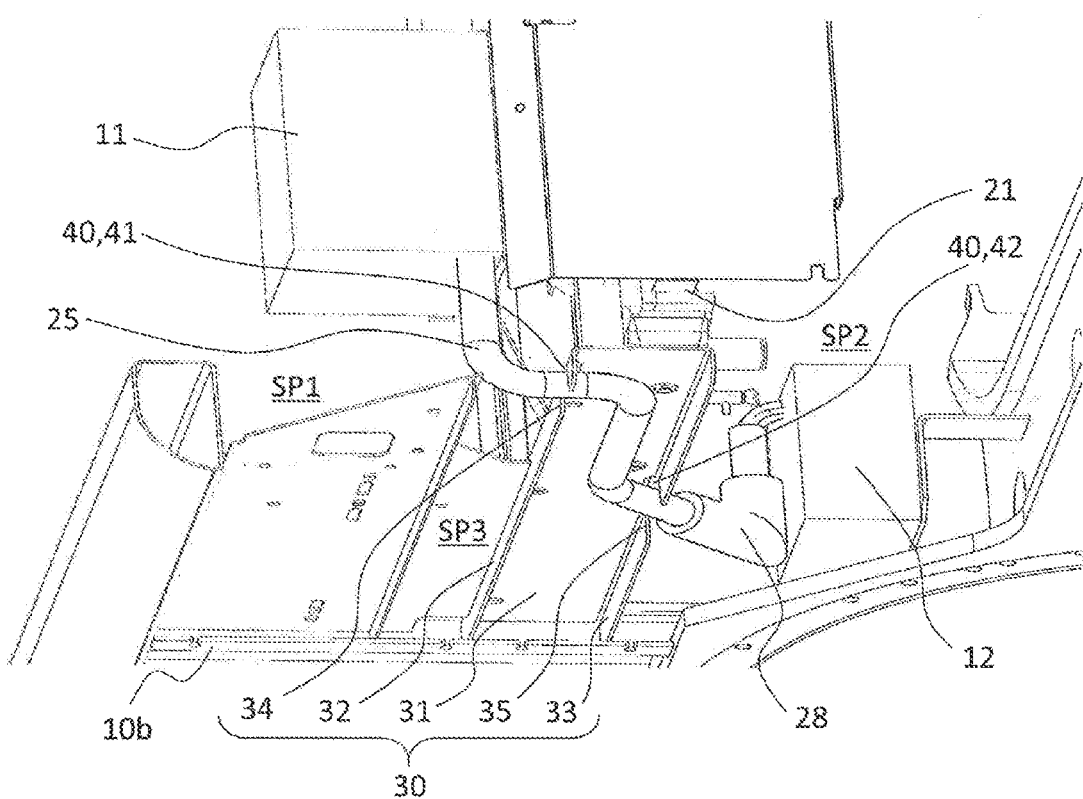
FIG. 3 is a perspective view as a main section in the engine room is viewed from a lower side.
Figure 4:
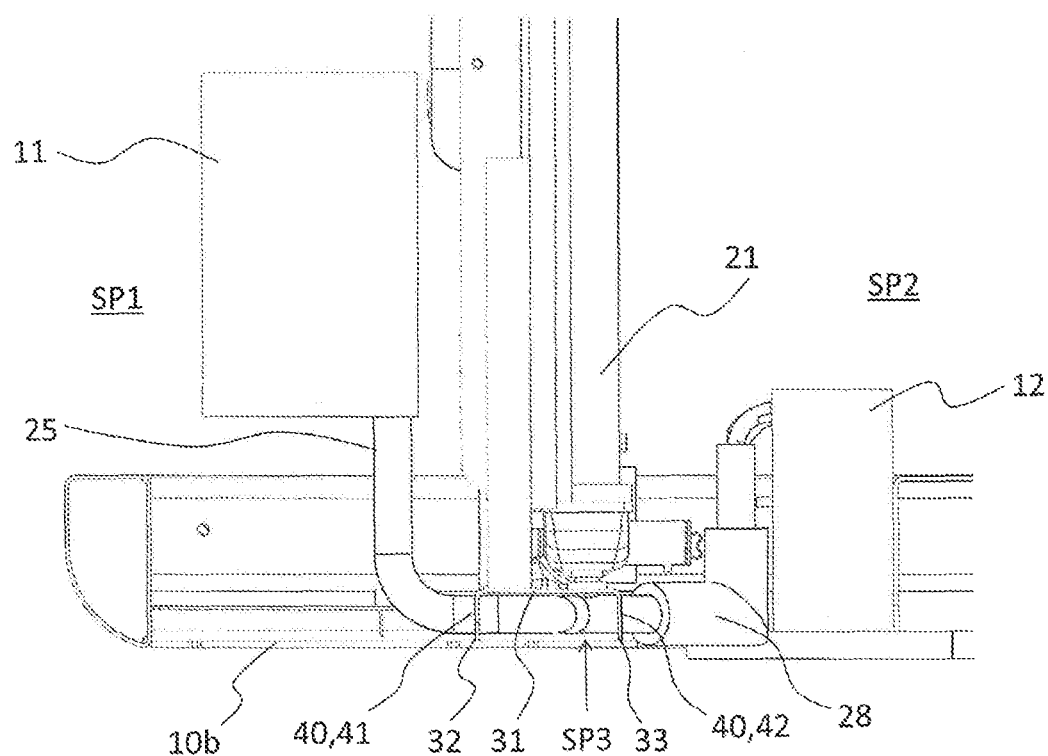
FIG. 4 is a diagram as the main section in the engine room is viewed from a lateral side.

Next, a mounting structure of the heat exchange unit 21, and wiring of the urea water hose 25 will be described in detail. FIG. 3 is a perspective view as a main section in the engine room is viewed from the lower side, and FIG. 4 is a diagram as the main section in the engine room is viewed from the vehicle body rear side. As illustrated in these figures, the heat exchange unit 21 is placed on a bracket 30 mounted on the side frame 10*b* of the turning frame 10.

The bracket 30 is a metal strength member having a substantially U-shaped cross-section opened downward, and includes a first side plate section 32 on a first space SP1 side (left) facing a radiator space side on which the urea water tank 11 is disposed, a second side plate section 33 on a second space SP2 side (right) facing the inside of the engine room 5, and a top plate section 31 connecting the first side plate section 32 and the second side plate section 33. A first cutout section 34 for allowing the urea water hose 25 to be inserted, and a second cutout section 35 for allowing the urea water hose 25 to be inserted are provided in the first side plate section 32 and the second side plate section 33, respectively.

The first cutout section 34 is provided near a rear end of the bracket 30, and the second cutout section 35 is provided at a substantial center position in the longitudinal direction of the bracket 30. That is, the first cutout section 34 and the second cutout section 35 are in positional relation in which the first cutout section 34 and the second cutout section 35 are deviated in the front-rear direction (left and right direction in FIG. 2).

In order to connect the urea water tank 11 and the pump 12 by the urea water hose 25, an end of the urea water hose 25 is first connected to the urea water tank 11. Next, the other end of the urea water hose 25 passes through the first cutout section 34, and while the urea water hose 25 is bent in a crank shape in an internal space SP3 of the bracket 30, the other end of the urea water hose 25 passes through the second cutout section 35 to be guided to the second space SP2. Thereafter, when the other end of the urea water hose 25 is connected to the pump 12, wiring of the urea water hose 25 between the urea water tank 11 and the pump 12 is completed.

At this time, the urea water hose 25 is preferably wired so as to be trained against a bottom of the engine room 5 as much as possible. When the urea water hose 25 is wired at a high position in the engine room 5, in a case where urea water leaks due to a crack caused on the urea water hose 25, or the like, there is a risk that the engine 13 or the like is corroded by the leaked urea water. Similarly, wiring between the pump 12 and the injector 14 is performed such that the urea water hose is trained against the bottom of the engine room 5 as much as possible.

Furthermore, a first clearance 41 between the first cutout section 34 and the urea water hose 25, and a second clearance 42 between the second cutout section 35 and the urea water hose 25 are filled with fillers 40 made of, for example, urethane resin. Consequently, high-temperature air in the second space SP2 can be prevented from passing through the above clearances to enter the first space SP1.

In this embodiment, the first clearance 41 and the second clearance 42 are filled with the fillers 40. However, at least the second clearance 42 only needs to be filled with the filler 40 from a viewpoint of prevention of entry of the high-temperature air. Consequently, it is possible to reduce the used amount of the filler 40, and therefore it is possible to reduce the cost.

As described above, according to this embodiment, the urea water hose 25 can be efficiently wired by effectively using the internal space SP3 of the bracket 30, which becomes a dead space. Additionally, the urea water hose 25 is physically protected by the bracket 30, the internal space SP3 is sealed by the filler 40, and the urea water hose 25 wired in the internal space SP3 is less likely to be influenced by heat from the second space SP2. Therefore, a portion of the urea water hose 25, the portion being covered in the internal space SP3, does not need to be separately covered by a protective material in order to prevent damage, and the urea water hose 25 does not need to be covered with a thick heat insulator. Accordingly, it is possible to expect various excellent effects such as reduction of working time in the wiring of the urea water hose 25, reduction in cost, and prevention of deterioration of urea water.

The above embodiment is an example for describing the present invention, and is not intended to limit the scope of the present invention. Those skilled in the art can implement the present invention in other various modes without departing from the scope of the present invention.

REFERENCE SIGNS LIST 1 minimal swing radius type hydraulic excavator (construction machine)
2 undercarriage
3 upperstructure
5 engine room
11 urea water tank (reducing agent tank)
13 engine
14 injector
16 exhaust gas post-treatment device
18 cooling fan
21 heat exchange unit (heat exchanger)
25 urea water hose (reducing agent hose)
30 bracket
31 top plate section
32 first side plate section
33 second side plate section
34 first cutout section
35 second cutout section
40 filler
41 first clearance
42 second clearance
SP1 first space
SP2 second space
SP3 internal space of bracket

The invention claimed is:

1. A construction machine comprising:
an undercarriage;
an upperstructure that is turnably provided on the undercarriage;
an engine room that is provided on the upperstructure;
a reducing agent tank that is disposed in a radiator space adjacent to the engine room, and stores a reducing agent;
an engine, a cooling fan that rotates by driving of the engine, an injector that injects the reducing agent to exhaust gas exhausted from the engine, and a reducing agent hose that connects the injector and the reducing agent tank, which are provided in the engine room; and
a heat exchanger that is disposed between the reducing agent tank and the cooling fan, performs heat exchange by cooling air generated by rotation of the cooling fan to cool the engine, the construction machine comprising
a bracket for placing the heat exchanger, the bracket being composed of a strength member having a substantially U-shaped cross-section opened downward, having a first side plate section facing a side of the radiator space on which the reducing agent tank is disposed, a second side plate section facing inside of the engine room, and a top plate section connecting the first side plate section and the second side plate section, wherein
a first cutout section for allowing the reducing agent hose to be inserted, and a second cutout section for allowing the reducing agent hose to be inserted are provided in the first side plate section and the second side plate section, respectively, and
a portion of the reducing agent hose passes through the first cutout section and the second cutout section to be wired in an internal space of the bracket.

2. The construction machine according to claim 1, wherein
among a first clearance between the first cutout section and the reducing agent hose, and a second clearance between the second cutout section and the reducing agent hose, at least the second clearance is filled with a filler.

* * * * *